T. E. MURRAY.
VEHICLE WHEEL.
APPLICATION FILED DEC. 22, 1914.
1,139,895.
Patented May 18, 1915.
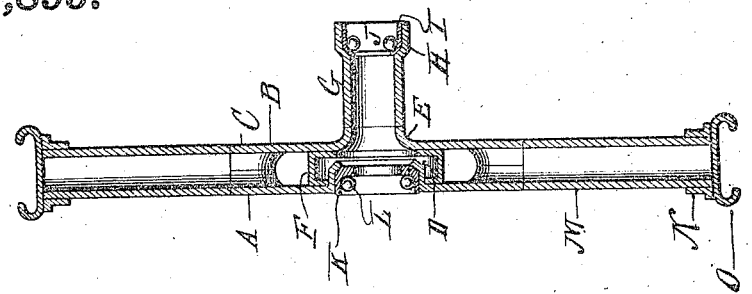
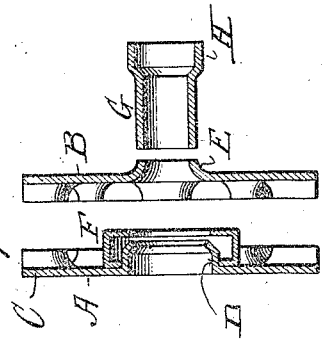
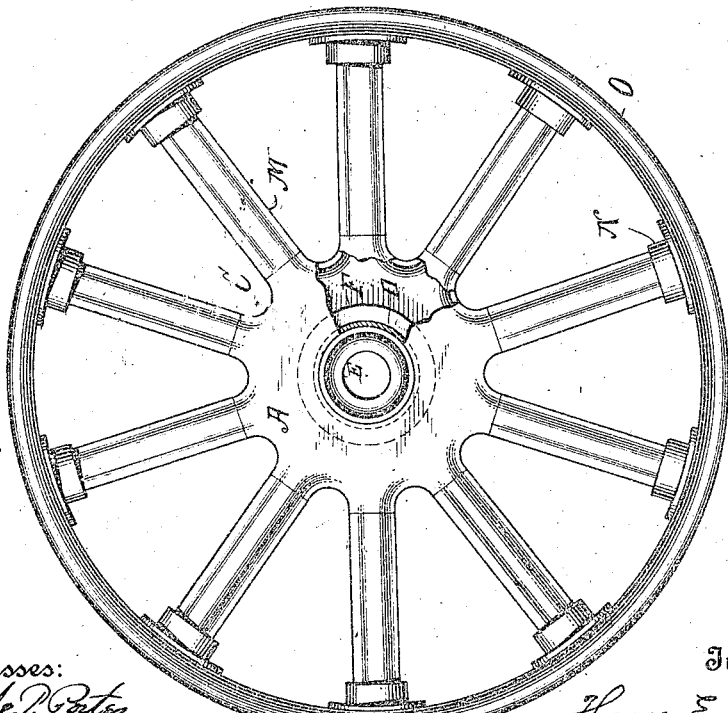
Witnesses:
Gertrude P. Bates
May T. McGarry.
Inventor
Thomas E. Murray
By his Attorney

UNITED STATES PATENT OFFICE.

THOMAS E. MURRAY, OF NEW YORK, N. Y.

VEHICLE-WHEEL.

1,139,895.  Specification of Letters Patent.  Patented May 18, 1915.

Application filed December 22, 1914. Serial No. 878,486.

*To all whom it may concern:*

Be it known that I, THOMAS E. MURRAY, a citizen of the United States, residing at New York, in the county of New York and State of New York, have invented a certain new and useful Improvement in Vehicle-Wheels, of which the following is a specification.

The invention relates to vehicle wheels of sheet metal, formed in sections which are homogeneously united, as by electrical welding.

The invention has for its object to cheapen and simplify the manufacture, and consists in the construction hereinafter described and more particularly pointed out in the claims.

In the accompanying drawings Figure 1 is a face elevation of my wheel. Fig. 2 is a diametral section, and Fig. 3 is a similar section of the parts of the hub.

Similar letters of reference indicate like parts.

The wheels is made wholly of sheet metal, and its several parts are homogeneously united by welding, preferably electrical. The hub is formed in halves of two plates A, B, each plate having semi-tubular circumferential projections C on its inturned circumferential edges. In plate A is an inwardly projecting flange D, and in plate B is an outwardly projecting flange E. Seated upon flange D is an annular box F. In order to complete the hub, the two plates A, B are brought together with their inturned edges in juxtaposition, the box F being first placed upon the flange D, and then said plate edges are homogeneously united. The walls of box F then meet the inner faces of plates A, B. To the outer face of flange E is homogeneously united a sleeve G, having at its outer end a shouldered enlargement H which receives the runway I of bearing-balls J. A similar runway K with bearing-balls L is placed in flange D. Said balls bear upon the axle (not shown) which extends through the hub.

To the outer faces of the projections C are butt-welded the inner ends of the tubular spokes M, the outer ends of which are welded in sockets N, in turn welded to the inner periphery of the tire-receiving rim O.

This construction produces a sheet metal wheel which is exceedingly strong and also cheaply and easily made. The meeting faces at the joints between spokes and hub, and between the hub plates and sleeve G, can all be machined true before the welding is done, thus insuring a connection practically as strong as the solid metal.

I claim:

1. A sheet metal wheel for vehicles, comprising two hub plates having inturned circumferential edges and semi-tubular projections on said edges, and tubular spokes; the inturned edges of said plates being homogeneously united and the edges of said projections being homogeneously united to form tubular projections and the said spokes being homogeneously united at their ends to said tubular projections.

2. A sheet metal wheel for vehicles, comprising two hub plates having inturned circumferential edges and semi-tubular projections on said edges, and tubular spokes, the inturned edges of said plates being homogeneously united and the edges of said projections being homogeneously united to form tubular projections and the said spokes being homogeneously united at their ends to said tubular projections, a rim, and sockets on the inner periphery of said rim receiving the outer ends of said spokes.

3. A sheet metal wheel for vehicles, comprising two hub plates having inturned circumferential edges and semi-tubular projections on said edges, a central tubular flange on one of said plates, tubular spokes, and a sleeve; the inturned edges of said plates being homogeneously united and said semi-tubular projections being homogeneously united to form tubular projections and said spokes being homogeneously united at their inner ends to said tubular projections and said sleeve being homogeneously united to said central tubular flange.

4. A sheet metal wheel for vehicles, comprising two hub plates having inturned circumferential edges and semi-tubular projections on said edges, a central tubular flange on one of said plates, and tubular spokes, the inturned edges of said plates being homogeneously united and said semi-tubular projections being homogeneously united to form tubular projections and said spokes being homogeneously united at their ends to said tubular projections, and an annular box seated on said inturned central tubular flange and having its walls in contact with the inner faces of said hub plates.

In testimony whereof I have affixed my signature in presence of two witnesses.

THOMAS E. MURRAY.

Witnesses:
GERTRUDE T. PORTER,
MAY T. MCGARRY.